United States Patent [19]

Morgan et al.

[11] 4,099,316

[45] Jul. 11, 1978

[54] APPARATUS FOR INSERTING DISPLATION TYPE TERMINALS INTO CAVITIES

[75] Inventors: Joe Pierce Morgan, Camp Hill; Howard Charles Phillips, Harrisburg; Richard Vernon Spong, New Cumberland, all of Pa.

[73] Assignee: AMP Incorporated, Harrisburg, Pa.

[21] Appl. No.: 799,838

[22] Filed: May 23, 1977

[51] Int. Cl.2 ........................ B23P 23/00; B23P 23/04

[52] U.S. Cl. .................................. 29/566.2; 29/33 M; 29/736

[58] Field of Search ................ 29/33 M, 566.1, 566.2, 29/566.3, 736

[56] References Cited

U.S. PATENT DOCUMENTS

| | | | |
|---|---|---|---|
| Re. 28,119 | 8/1974 | Busler et al. | 29/566.2 |
| 3,576,063 | 4/1971 | Bakermans | 29/566.2 |
| 3,641,650 | 2/1972 | Folk | 29/736 |
| 3,739,446 | 6/1973 | Long et al. | 29/566.2 |
| 3,848,316 | 11/1974 | Bakermans et al. | 29/566.2 |
| 3,867,754 | 2/1975 | Koch et al. | 29/566.2 |

*Primary Examiner*—Harrison L. Hinson
*Attorney, Agent, or Firm*—F. W. Raring; J. L. Seitchik; W. J. Keating

[57] ABSTRACT

A machine for inserting displation type terminals in strip form into cavities in a coil bobbin or the like comprises first and second slide assemblies in parallel side-by-side relationship. The strip of terminals is fed towards the insertion zone of the apparatus by a feeding means which is actuated during movement of the first slide member along its working stroke. A shearing means for shearing terminals from the strip is also actuated by the first slide member and this shearing means serves to place the sheared terminals in front of insertion members carried by the second slide member. Finally, during the working stroke of the first slide member, the insertion punches move relative to the second slide towards the insertion zone to advance the sheared terminals in a guide tube on the second slide member. During the working stroke of the second slide member, the terminal guide tube carried on the second slide is moved up to the workpiece and thereafter, the guide tube remains stationary as the insertion punches push the terminals into the cavities in the workpiece. The terminals move past wires extending from the coil in the workpiece and drag the wires into the cavities. End portions of the wires are sheared by movable shearing blades on the second slide.

8 Claims, 18 Drawing Figures

U.S. Patent July 11, 1978 Sheet 8 of 12 4,099,316

APPARATUS FOR INSERTING DISPLATION TYPE TERMINALS INTO CAVITIES

BACKGROUND OF THE INVENTION

This invention relates to apparatus for inserting displation type terminals into the cavities in a workpiece such as a motor stator, a coil bobbin, or any other electrical component having a coil winding thereon. U.S. Pat. No. 3,984,908 discloses and claims a known type of insertion apparatus for performing this general type of terminal insertion operation.

The term "displation" has been coined to identify and describe that type of wire connection in which the wire is moved relatively into a narrow slot in a terminal, the width of the slot being such that the edges of the slot penetrate the insulation of the wire and establish electrical contact with the conducting core of the wire. A wide variety of displation type contact terminals are now known to the electrical industry and this method of making electrical connections is rapidly being applied to numerous new electrical connection problems. U.S. Pat. No. 3,984,908 discloses an apparatus for inserting terminals which are particularly intended for establishing electrical connections with the wires of coil windings such as are used in motor stators, induction coils, and elsewhere. In general, the terminal shown in U.S. Pat. No. 3,984,908 comprises a U-shaped member having a pair of parallel plate sections connected by a bight. A relatively wide gap or opening is provided in the bight and slots are provided in the plate sections which extend to the gap or opening so that the wire can be moved laterally of its axis through the opening and into the wire-receiving slots. When the wire is of the type used for in a coil winding, it will have a varnish type insulation thereon, such as a polyvinyl formal resin and this insulation is penetrated by the edges of the slots in the terminal. The apparatus shown in U.S. Pat. No. 3,984,908 is, as mentioned previously, particularly intended to insert terminals into a plastic frame or housing of a stator; the wire from the stator winding is positioned with its axis extending transversely of a cavity in the plastic stator frame and as the terminal is pushed into the cavity, the wire is moved relatively into the slot in the terminal. An end portion of the wire is trimmed by a shearing blade and the cut end is dragged into the cavity so that this cut is not exposed after the terminal is fully inserted.

The apparatus shown in U.S. Pat. No. 3,984,908 is being widely used in the electrical industry, particularly in the manufacture of electrical motors and has prooved to be highly successful. However, this apparatus has certain limitations which restrict its use under many of the circumstances and working conditions under which displation type connections are mated to the wires of coil windings.

The instant invention is directed to the achievement of an improved terminal insertion apparatus for inserting terminals into a winding support and which can be used under a wide range of conditions. Thus the invention is directed to an extremely compact apparatus which can be mounted on a work bench and manually operated; that is, under circumstances where the operator places the individual workpiece on the apparatus, actuates the apparatus, and removes the workpiece from the apparatus after the wire terminations have been made. The invention is further directed to the achievement of an apparatus which can be mounted adjacent to, or on, a fully automatic assembly machine so that it might become an integrated part of the machine; thus, apparatus in accordance with the invention can be mounted adjacent to a bobbin winding machine having work transfer means for transferring the workpiece to the terminal insertion apparatus after the winding has been placed on the bobbin so that the electrical connections to the winding can be made immediately after the coil winding step has been carried out. The high degree of versatility is achieved by virtue of an arrangement of the parts and a reassignment of the functions of the parts which results in an extremely compact apparatus which lends itself to the widespread useage or useage under widely varying conditions.

Other features of apparatus in accordance with the invention are its adaptability to workpieces of many different sizes and shapes such as coils wound on bobbins, motor stators, relay devices, and so on. The time interval required for the apparatus to carry out its operating cycle is also shortened as compared with previously known insertion apparatus and the cycle itself is devided or split in a way such that the workpiece, for example, the coil bobbin, can be mounted on, or removed from, the apparatus, while the machine is going through a portion of its cycle.

It is accordingly an object of the invention to provide an improved apparatus for inserting displation type terminals into an insulating support or housing such as a plastic coil bobbin. A further object is to provide a machine which can be used under a wide variety of conditions. A further object is to provide a versatile machine which can be used with a wide variety of terminal types or sizes. A further object is to provide an extremely compact machine having improved actuating means which can be readily serviced or adjusted for different operating conditions.

These and other objects of the invention are achieved in a preferred embodiment thereof which is briefly described in the foregoing abstract, which is described in detail below, and which is shown in the accompanying drawing in which.

Figure 8:
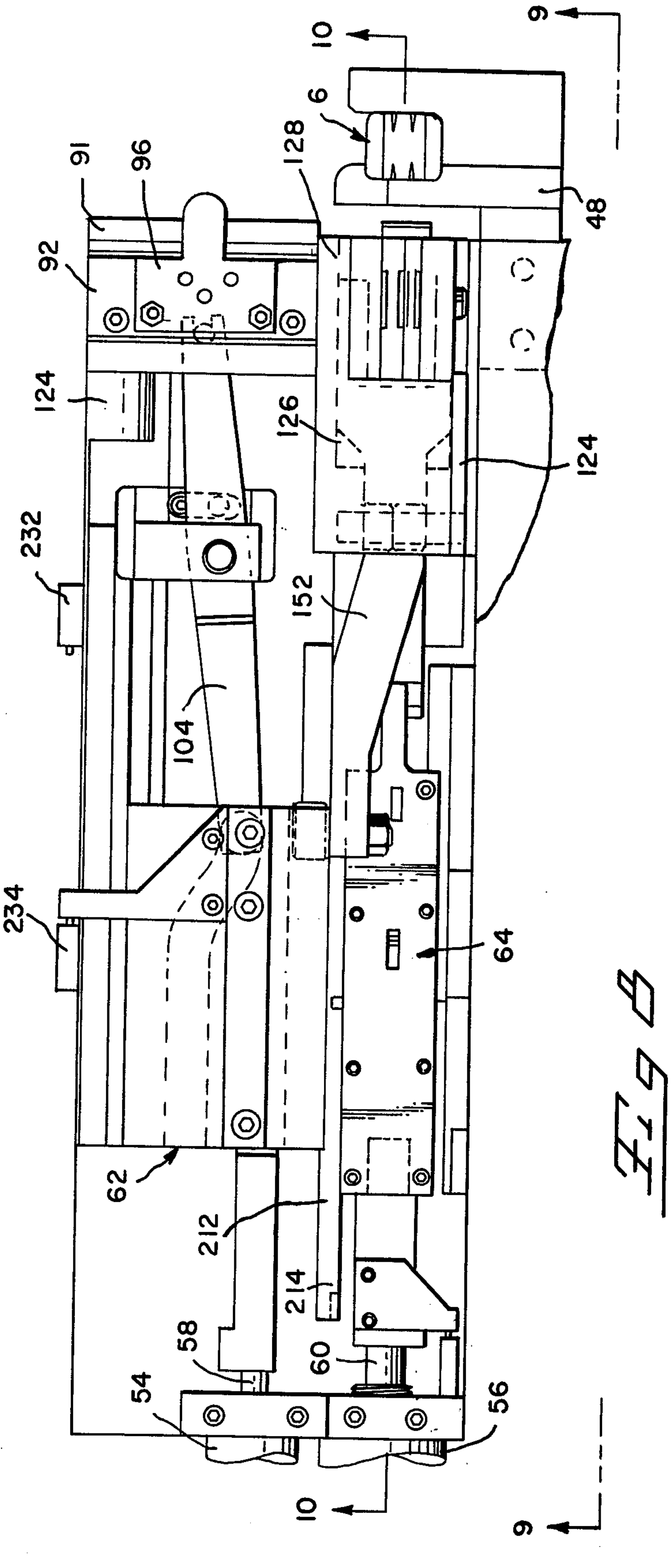
FIG. 8 is a top plan view of an apparatus in accordance with the invention.
Figure 9:
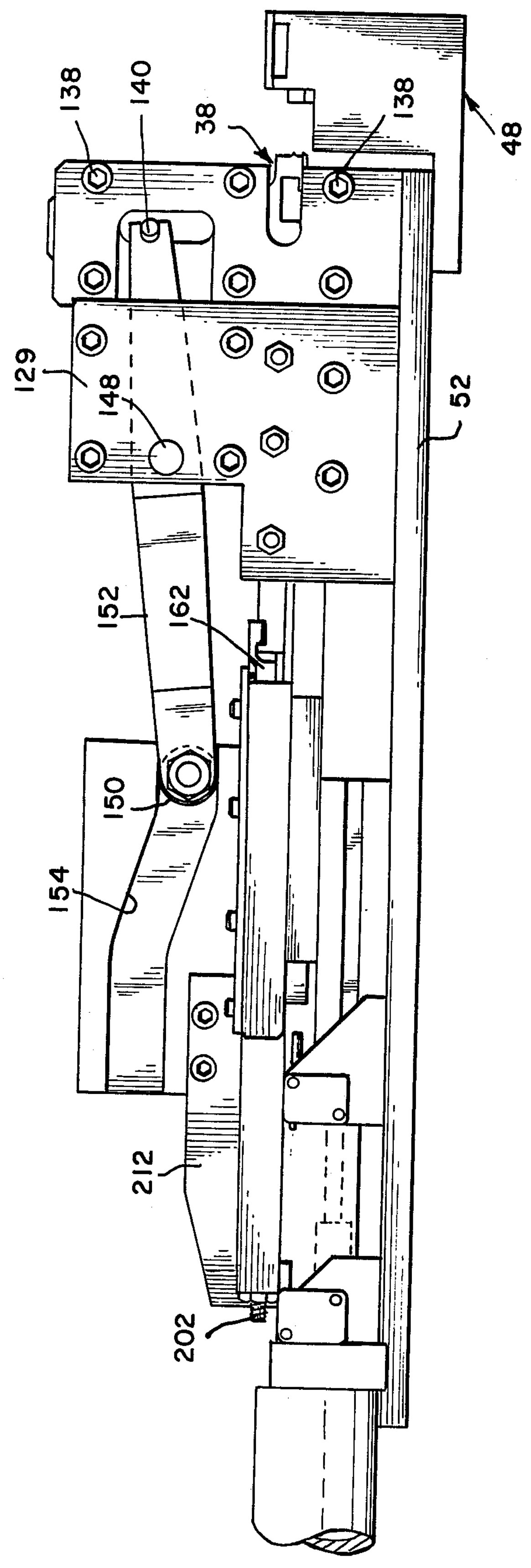
FIG. 9 is a side view looking in the direction of the arrows 9—9 of FIG. 8.
Figure 10A:
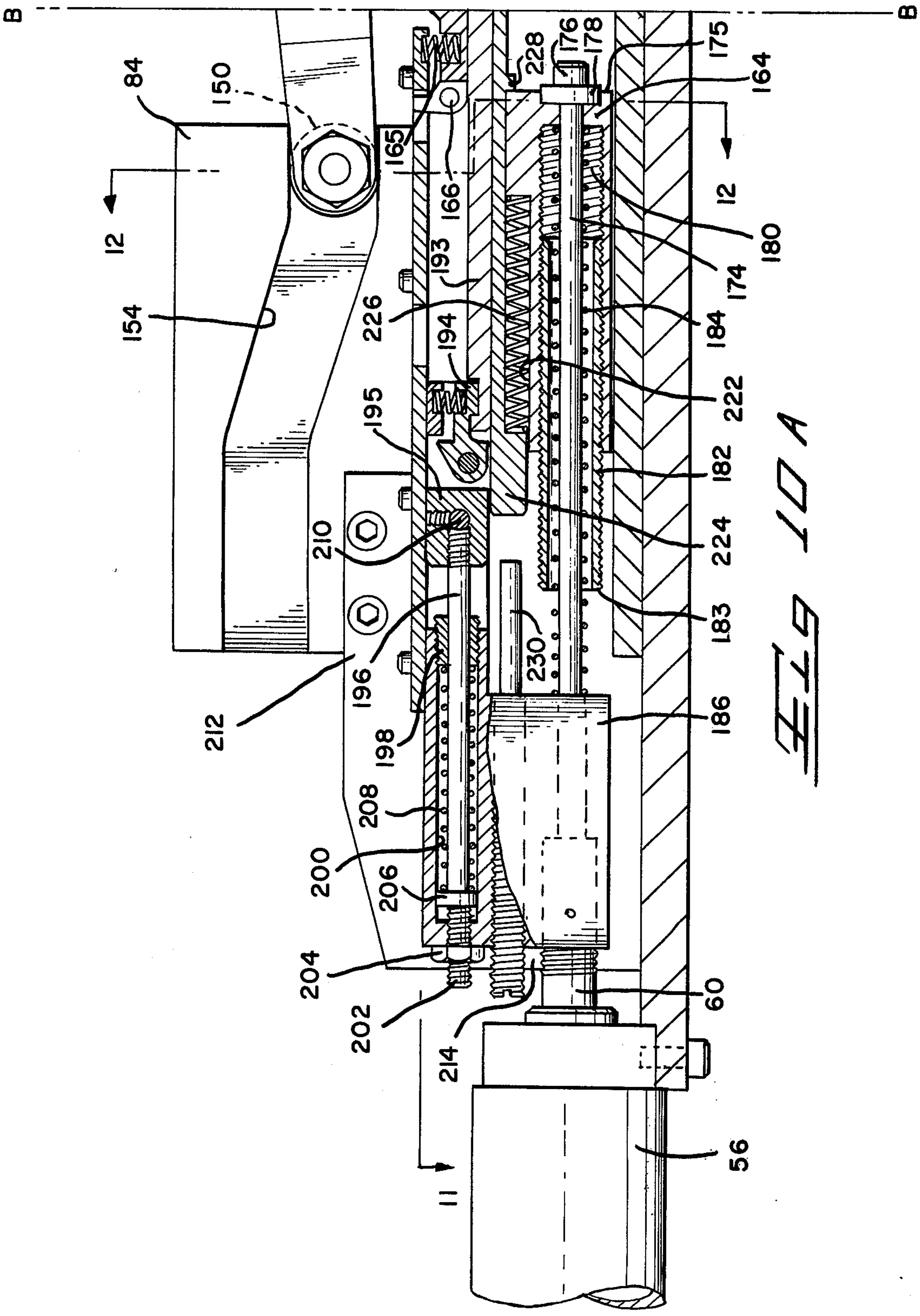
Figure 10B:
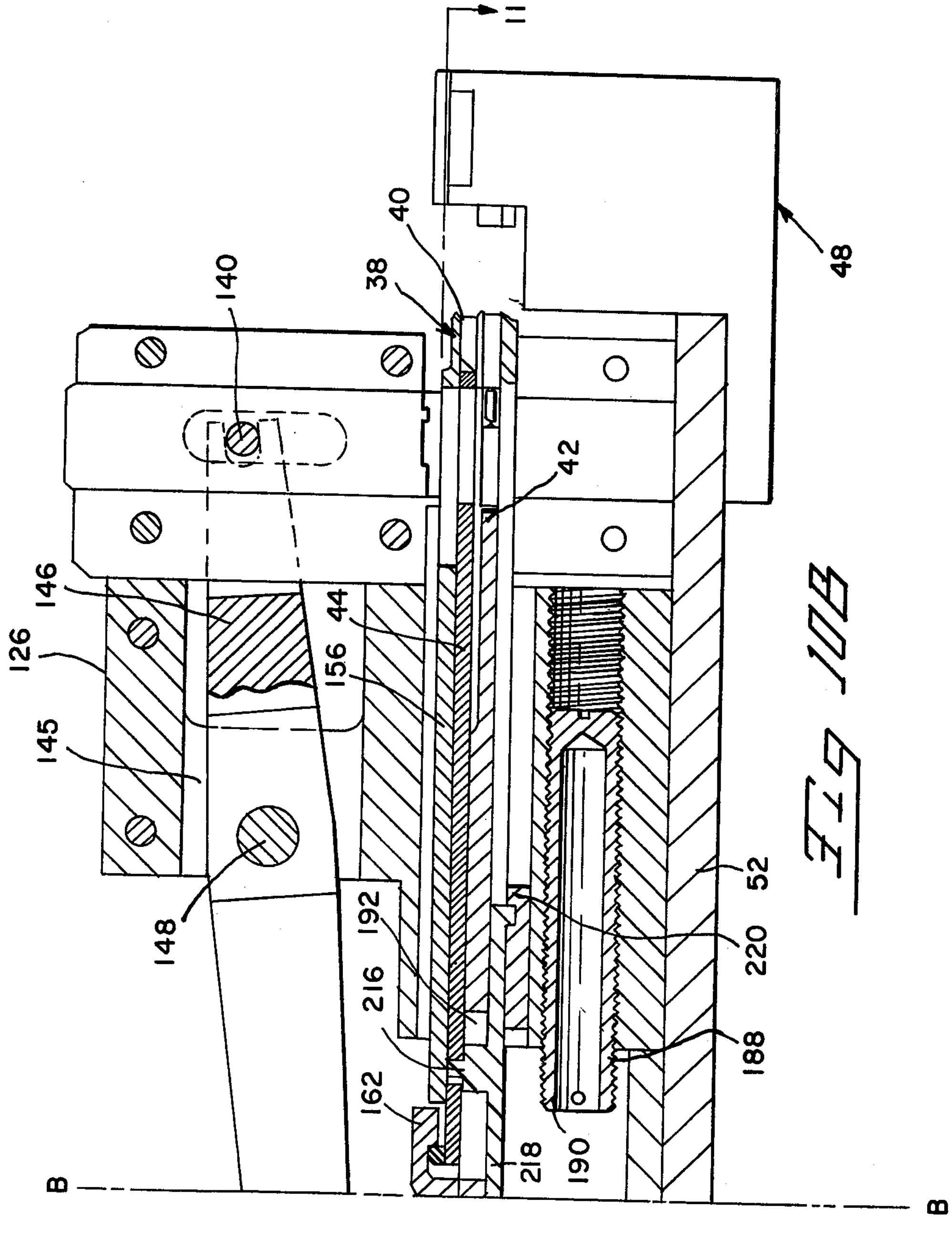
Figure 11A:
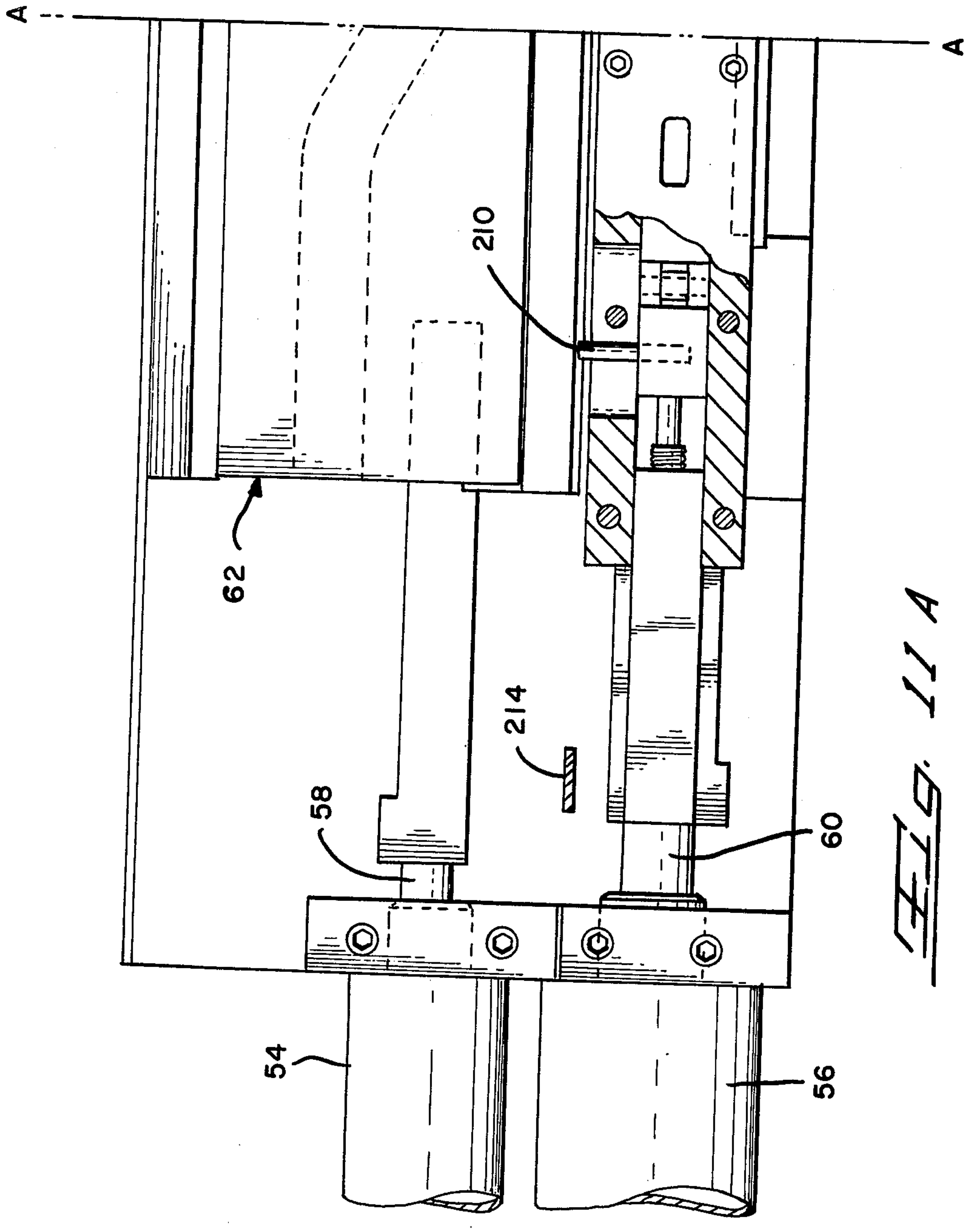
Figure 11B:
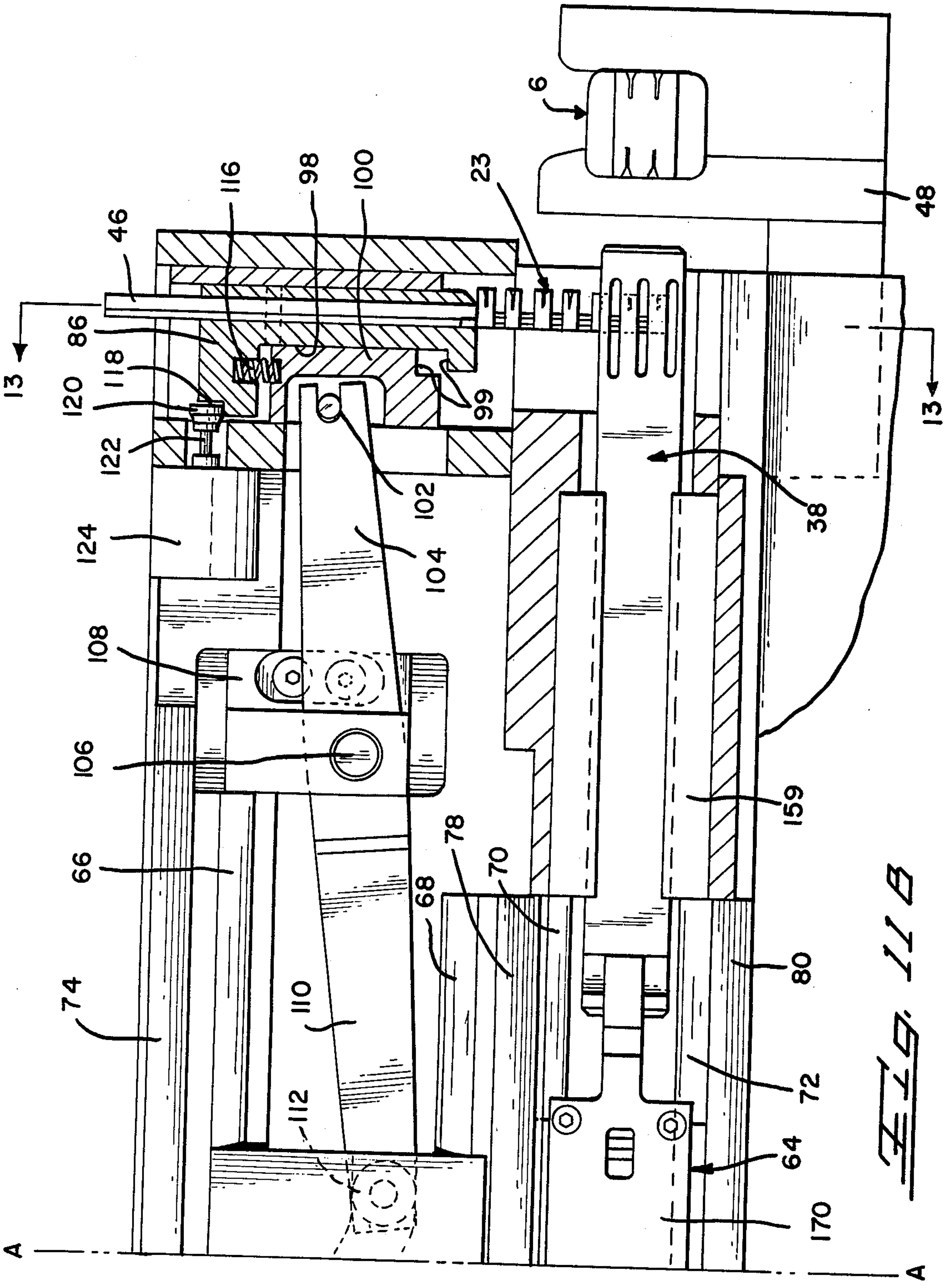

FIGS. 10 and 11 are views taken along the lines 10—10 and 11—11 of FIGS. 8 and 10 respectively; FIGS. 10 and 11 are divided into two parts, 10A, 10B, and 11A, 11B and the composite figures can be made by placing the broken dividing lines of the figures against each other. It will be understood that when reference is made in the specification to FIG. 10 or FIG. 11, the composite view is intended.

Figure 12:
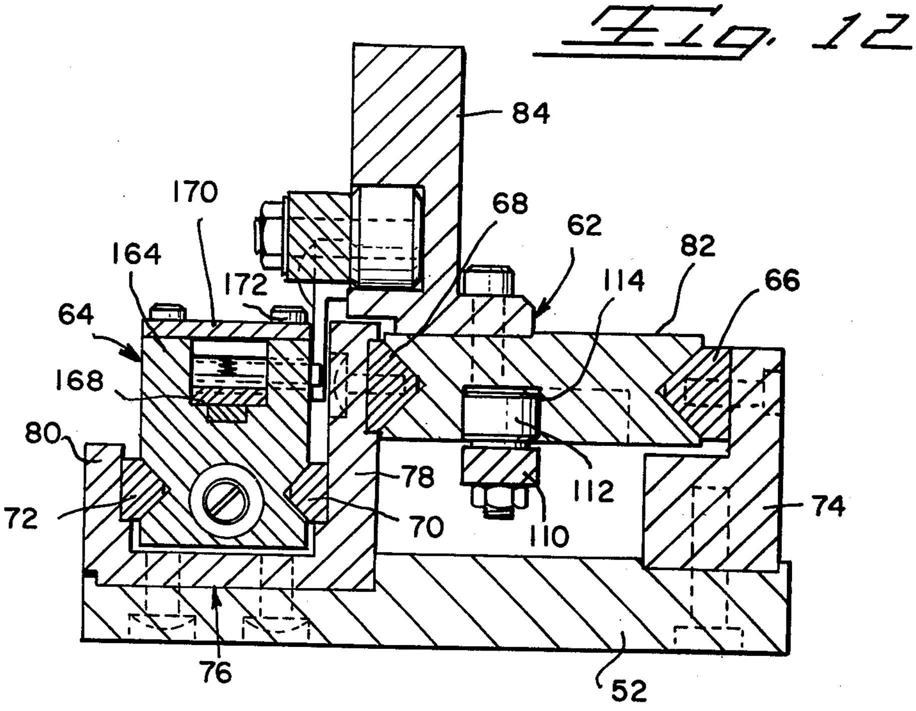

FIG. 12 is a view taken along the lines 12—12 of FIG. 10.

Figure 13:
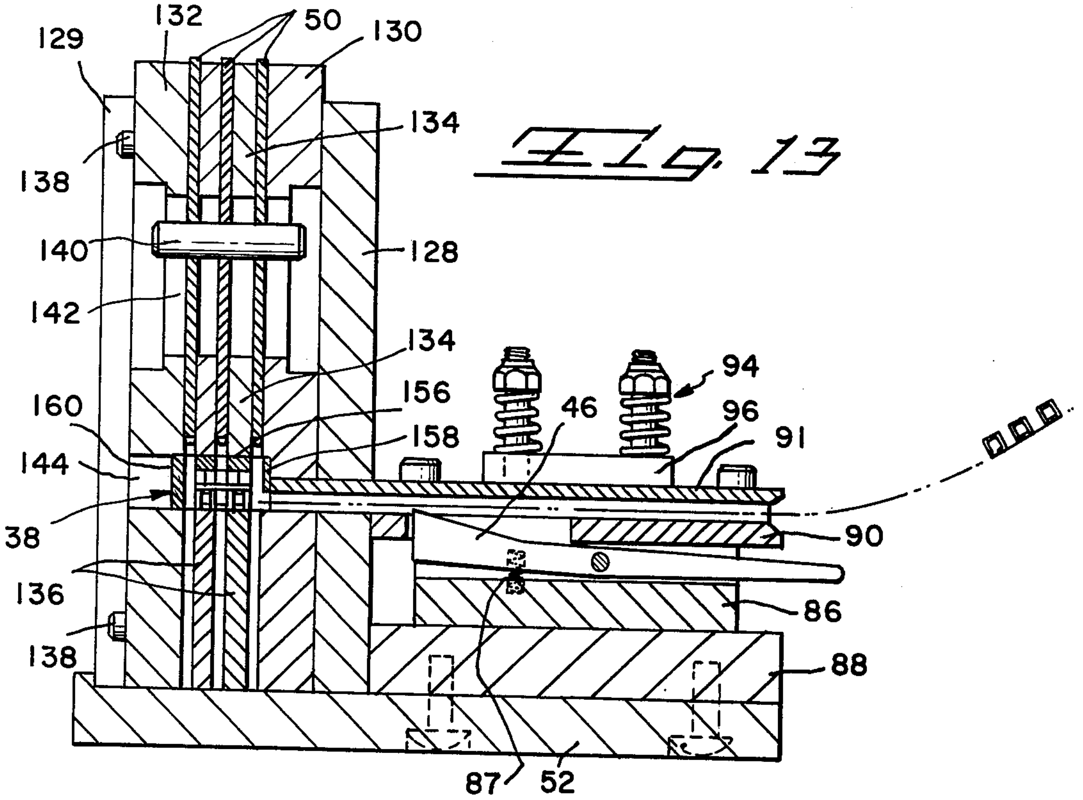

FIG. 13 is a view taken along the lines 13—of FIG. 11.

Figure 14:
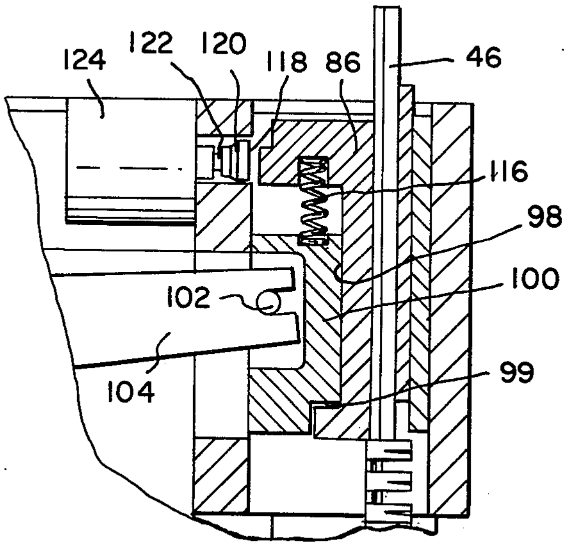

FIG. 14 is a fragmentary plan sectional view of a portion of the strip feed mechanism illustrating the mechanism in its two-terminal feed mode.

Figure 15:
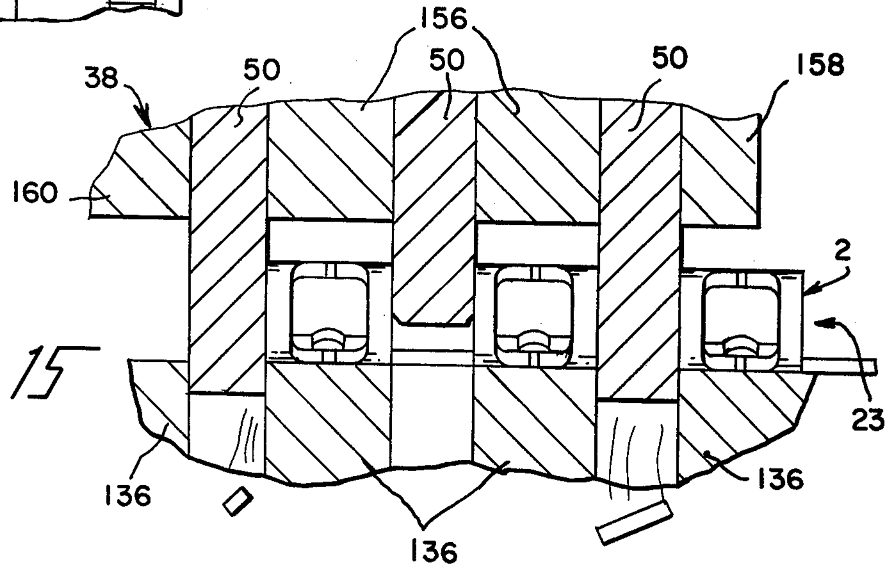

FIG. 15 is a fragmentary sectional view taken vertically through the terminal guide tube illustrating the shearing of the carrier strip from previous feed terminals.

Figure 16:
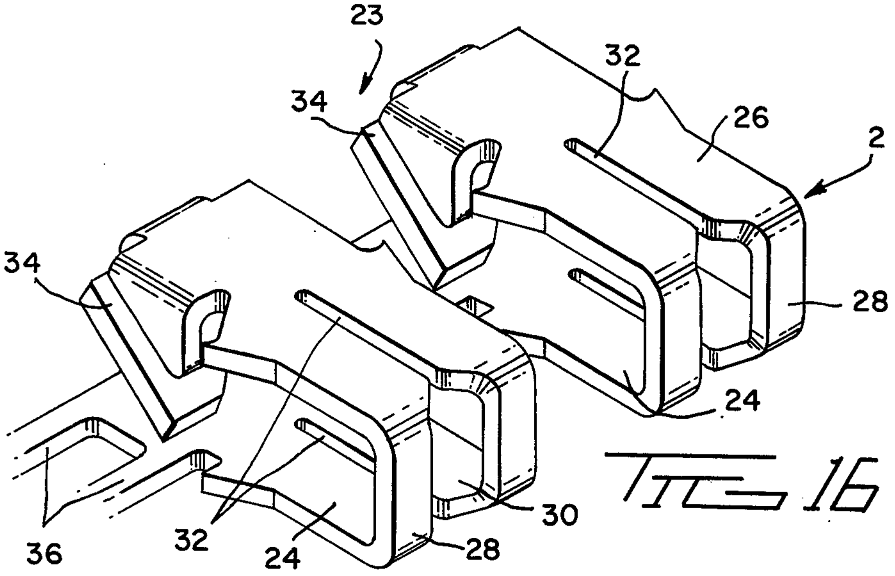

FIG. 16 is a perspective view of a short section of terminal strip of the type intended for use with the apparatus shown.

The principles of the apparatus are illustrated in the semi-diagramatic views of FIGS. 1–7 and the essential functions of the apparatus will first be described with reference to these Figures in order to facilitate the description presented subsequently of the detailed features.

The apparatus inserts individual terminals 2 into cavities 4 in a plastic coil bobbin 6. The end portions 8 of wires extending from the coil 10 on the bobbin are positioned in slots 18, 20 provided on one of the end flanges 14 and in an integral housing 16 of the bobbin. The bobbin has spaced-apart flanges 12, 14 between which the coil 10 is wound and is held by a fixture or work holder 48 adjacent to an insertion zone on the apparatus.

As shown in FIG. 14, each terminal 2 comprises a pair of spaced-apart parallel plate-like members 24, 26 which are connected by a bight or web 28. A gap or opening 30 is provided in the web and wire-receiving slots 32 extend into the plate-like members 24, 26 from this opening so that a wire can be moved laterally of its axis, through the opening 30 and into the slots 32. The particular terminal shown has a reversely formed extension 34 on the plate 26 which extends toward the internal surface of the plate 24 so that a further conductor, such as a pin or wire end can be connected to the terminal by inserting the further conductor and locating it between the end of the extension 34 and the internal surface of the blade 24. The terminals 2 are manufactured in the form of a continuous strip 23 with carrier strip means 36 extending between adjacent terminals in the strip.

The apparatus has a guide tube 38 which is normally located with its leading end 40 spaced from the coil bobbin 6 and a pair of side-by-side inserters 42 are slidably contained in the guide tube. A pair of wire cutters 44 are slidably mounted in the guide tube above the inserters 42 and are located such that they will move over the upwardly facing surface 22 (as viewed in FIG. 1) integral housing 16 of a coil bobbin mounted on the fixture in the insertion zone. The terminal strip 23 is fed towards one side of the guide tube assembly 38 to position the two leading terminals of the strip in the guide tube and in front of the inserters 42. These leading terminals are sheared from the strip by three movable shearing blades 50 which move downwardly (FIG. 3) through openings in the guide tube and sever the carrier strip slugs 36' from the terminals so that the slugs fall away. The shearing blades 50 remain in their lowered positions, FIG. 4, while the inserters 42 move a short distance forwardly, the guide tube assembly 38 remaining stationary during such movement of the inserters so that the terminals are positioned with the web portions thereof at the face 40 of the guide tube. Thereafter, the inserters are retracted, the shearing blades are moved upwardly (FIG. 5) and the guide tube assembly moves towards the bobbin. At this stage, the face of the guide tube assembly is against the housing portion 16 of the bobbin and the terminals are in alignment with the cavities 4. The guide tube remains stationary and the inserters and the movable shearing members 34 are thereafter moved towards the bobbin to insert the terminals into the cavities and to shear off the projecting end portions of the wires. The timing of this portion of the operating cycle is such that the wire ends are sheared prior to completion of the insertion terminal operation so that the sheared ends of the wires are dragged by the terminals into the cavities and are not exposed at the surface of the housing portion of the bobbin.

Turning now to FIGS. 8–13, the disclosed embodiment of the invention comprises a base plate 52 which is intended to be supported on a work bench or other surface having at its left hand end as viewed in FIG. 8 first and second side-by-side cylinders 54, 56 which have first and second piston rods 58, 60 respectively extending therefrom. The first piston rod 58 is coupled to a first slide assembly 62 and the second piston rod 60 is coupled to a second slide assembly generally indicated at 64. As shown in FIG. 12, the first slide assembly is supported by the gibs 66, 68 above the upper surface of base plate 52 and the second slide assembly is supported between gibs 70, 72. The gib 66 is mounted on a support block 74 secured to and extending upwardly from base plate 52. A generally U-shaped block 76 is secured to the base plate on the left hand side thereof as viewed in FIG. 12 and has upstanding arms 78, 80. The gib 68 of the first slide assembly 62 is mounted on the rightwardly facing surface and the gib 70 is mounted on the leftwardly facing surface of arm 78. The gib 72 is mounted on the internal surface of the arm 80 of the U-shaped block 76.

The slide assembly 62 is of relatively simple construction in that it comprises essentially a horizontallly extending camming block 82 which is supported between the gibs 66, 68 and a vertically extending camming block 84 which is fixed to the upper surface of the block 82 and which is located adjacent to, and extends above, the sidewall 78 of the U-shaped mounting block 76.

Referring now to FIGS. 8, 11, and 13, the terminal strip 23 is fed from a suitable supply source such as a reel by means of a reciprocating feed block 86 having the previously identified feed pawl 46 pivotally mounted in a recess in the upper surface thereof. The pawl 46 extends upwardly through an opening and a feed track assembly 90 which straddles the reciprocating block 86 and which is supported on the mounting block 88. Pawl 46 is biased upwardly in FIG. 13 by a spring 87. The guide track for the terminal strip is provided in the upper surface of a block forming part of assembly 90 and is defined by an adjustable guide plate 92 and by a rib 91. A conventional resilient drag device as shown at 94 is provided for imposing a light force on the upper surface of the terminal strip 23 to prevent undesired movement of the strip relative to the feed track. This drag mechanism comprises a pressure plate 96 which is resiliently urged against the upper surface of the strip by suitable spring means as shown. The reciprocable feed block 86 has a recess 98 in its left hand side as viewed in FIG. 11 and a slidable actuator block 100 is slidably mounted in this recess. The actuator block 100 and the block 86 have opposed shoulders 99 which move against each other when the block 100 moves relatively downwardly as viewed in FIG. 11 to advance the feed block and move it towards the insertion zone. As will be explained below, the use of this separate actuator block in conjunction with a selective stop permits the feeding of either a single terminal or two terminals during each feeding stroke.

The block 100 has a recess therein which receives one end of a lever 104 and a pin 102 extending from the block 100 is received in an open ended slot. Lever 104 extends in a horizontal plane leftwardly towards the rear of the apparatus and is pivoted intermediate its ends at 106 on a pin which extends from an adjustable mounting block 108, adjustment being provided by suitable locking screws and oversized slots to permit movement of the pin 106 upwardly and downwardly as viewed again in FIG. 11. This mode of adjustment permits precise adjustment of the limits of the stroke of the terminal strip feed block 86. The left hand end of lever 110 extends beneath the camming block 82 (FIG. 12) and has a cam follower 112 on its end which is received in a cam track 114 in the camming block 82. It will be apparent from the shape of this cam track shown in FIG. 11 that upon movement of the camming block 82 to the right from the position of FIG. 11 the lever 104 will be swung through a slight clockwise arc and the blocks 100, 86 will be moved relatively towards the insertion zone and will be returned during return of the slide.

As previously mentioned, it is desirable to provide in the apparatus the option of feeding two terminals during each feeding stroke or a single terminal. FIG. 11 shows the apparatus in its single terminal feed mode while FIG. 14 shows the apparatus in its two-terminal feed mode. When the apparatus is in its single terminal feed mode, the feed block 86 is stopped during its return stroke by a stop 120 on the end of a piston rod 122. This piston rod extends from a piston cylinder 124 having an internal spring return such that the cylinder 124 must be maintained under pressure to maintain the stop 120 in the position shown in FIG. 11. As shown in the drawing, a recess 118 is provided in block 86 which has a shoulder that bears against the stop 120. When the machine is in the mode of FIG. 11 the amplitude of the feed stroke is equal to the pitch of the terminal strip so that the pawl 46 engages the strip at the leading terminal thereof. When it is desired to feed two terminals during each feed stroke, the cylinder 124 is exhausted of its pressure and the spring within the cylinder causes the piston rod 122 to retract so that the stop 120 is also retracted as shown in FIG. 14. Under these circumstances, the block 86 is moved to the position of FIG. 14 during its return stroke and the amplitude of the stroke is two times the pitch of the strip so that the feed pawl 46 engages the strip behind the second terminal thereof. The forward feed stroke is, of course, also two times the pitch of the strip when the apparatus is in the two terminal feed mode. A spring 116 is interposed between opposed surfaces of the blocks 100, 86 to provide the necessary overtravel of the block 100 when the apparatus is in its single terminal feed mode. In other words, during the return stroke, block 86 moves against stop 118 and comes to rest; block 100 continues to move away from the insertion zone upwardly (in FIG. 11) with accompanying compression of the spring 116.

The insertion zone lies within a housing block 126 mounted on base plate 52, and the housing block has a forwardly extending arm 128 that extends beside the feed mechanism, see FIG. 8. The lower side of this block 126 as viewed in FIG. 8 (the leftwardly facing side) is covered by a removable cover plate 129. Spaced apart support blocks 130, 132 are mounted in the insertion zone and the strip severing blades 50 are located between the opposed surfaces of the support blocks, suitable upper and lower spacers 134, 136 being provided between the blades to maintain the spacing thereof. The blades 50 are mounted by means of a pin 140 on one end of a lever 146, suitable clearance slot means 142 being provided in the blocks 130, 132 to permit vertical movement of this pin relative to the blocks. The blocks 130, 132 and the spacers 134 are maintained in assembled relationship by fasteners as shown at 138.

Figure 1:
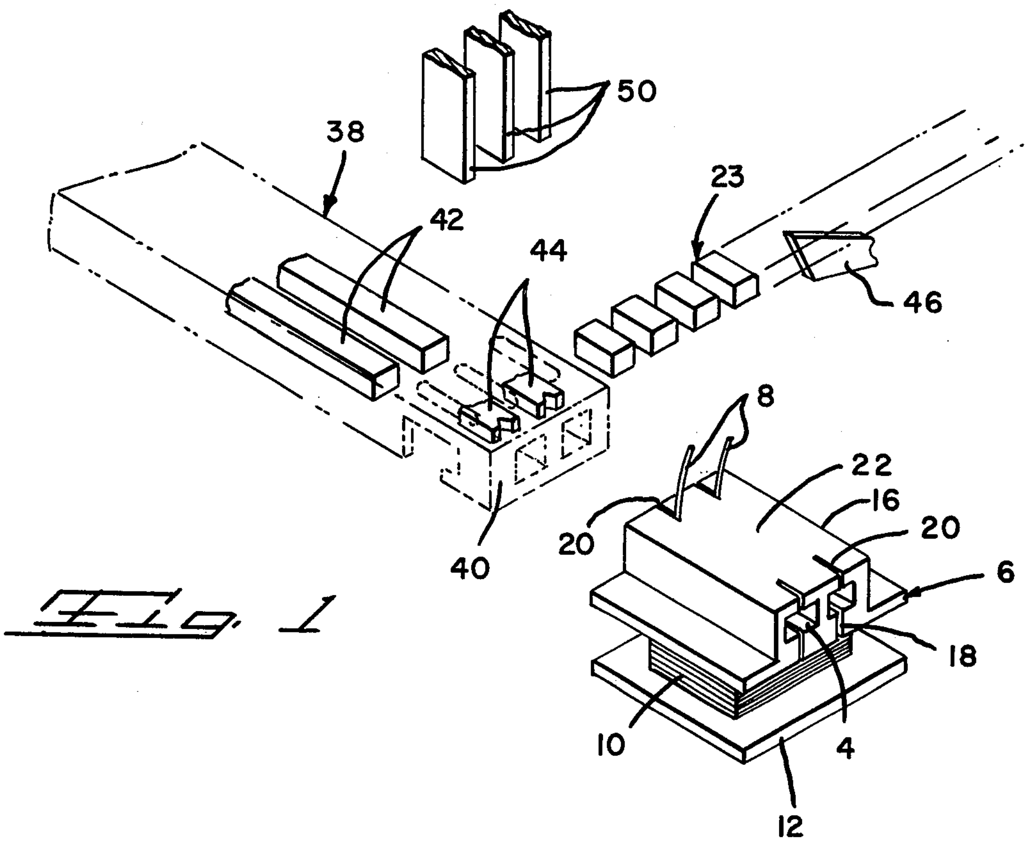
FIG. 1 is a perspective semi-diagramatic view showing some of the essential elements of the apparatus, the view showing the positions of these elements prior to the commencement of an operating cycle.
Figure 2:
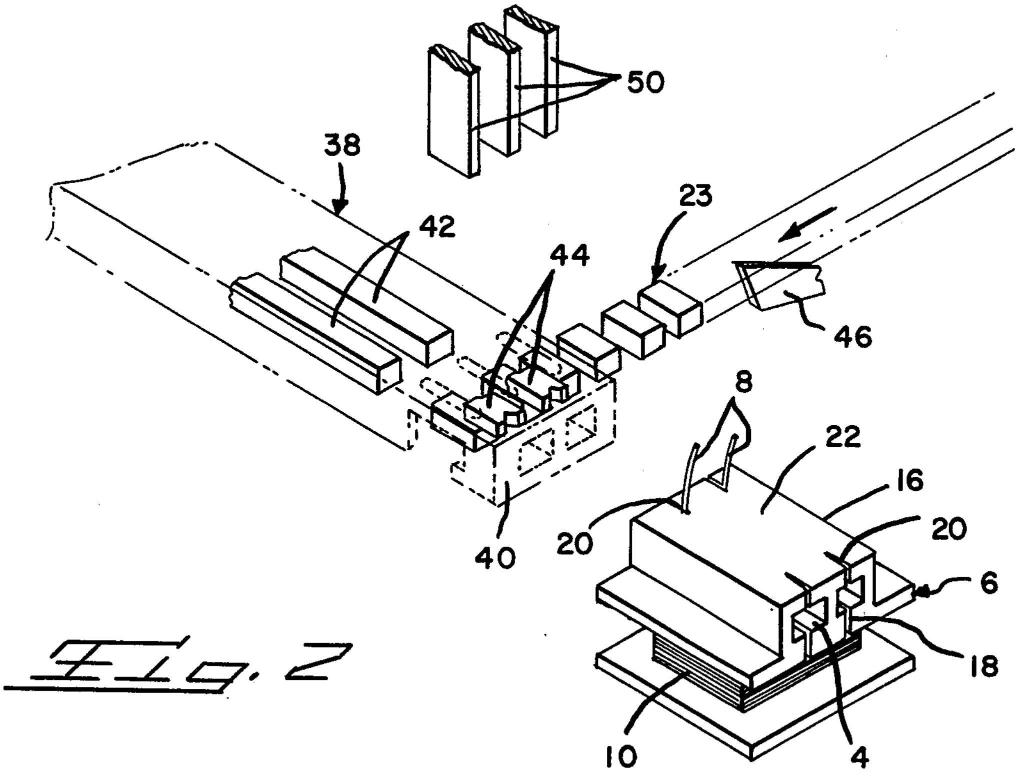
FIGS. 2–7 are views similar to FIG. 1 but showing the positions of the parts at successive stages of the operating cycle.
Figure 3:
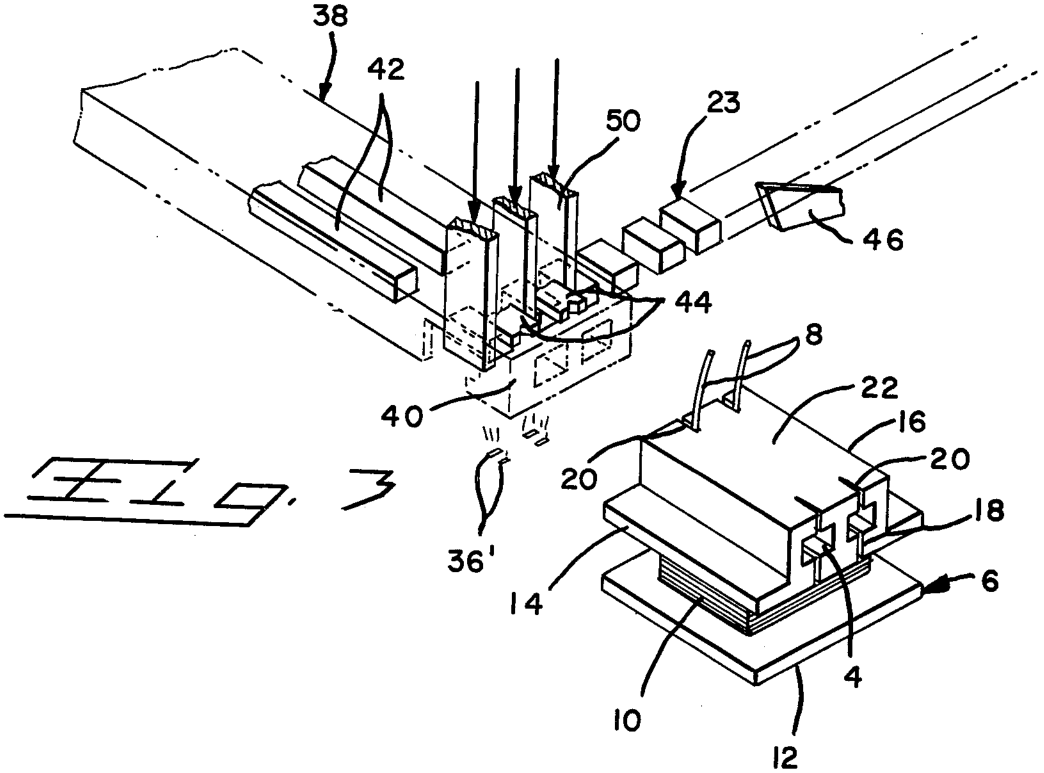
Figure 4:
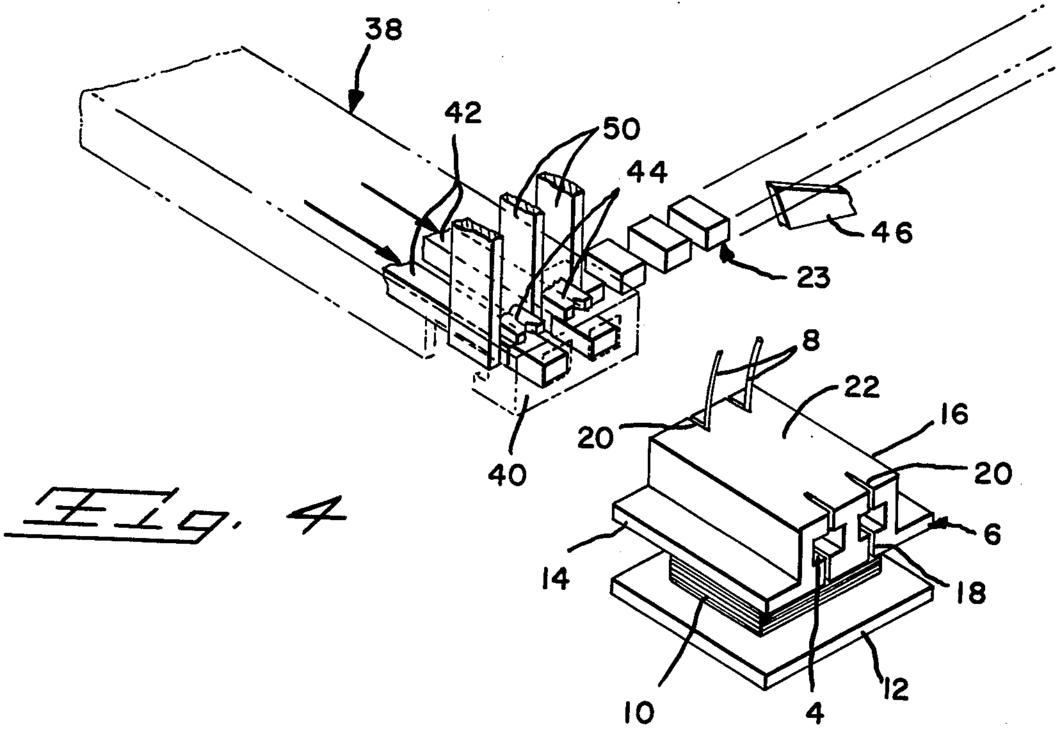
Figure 5:
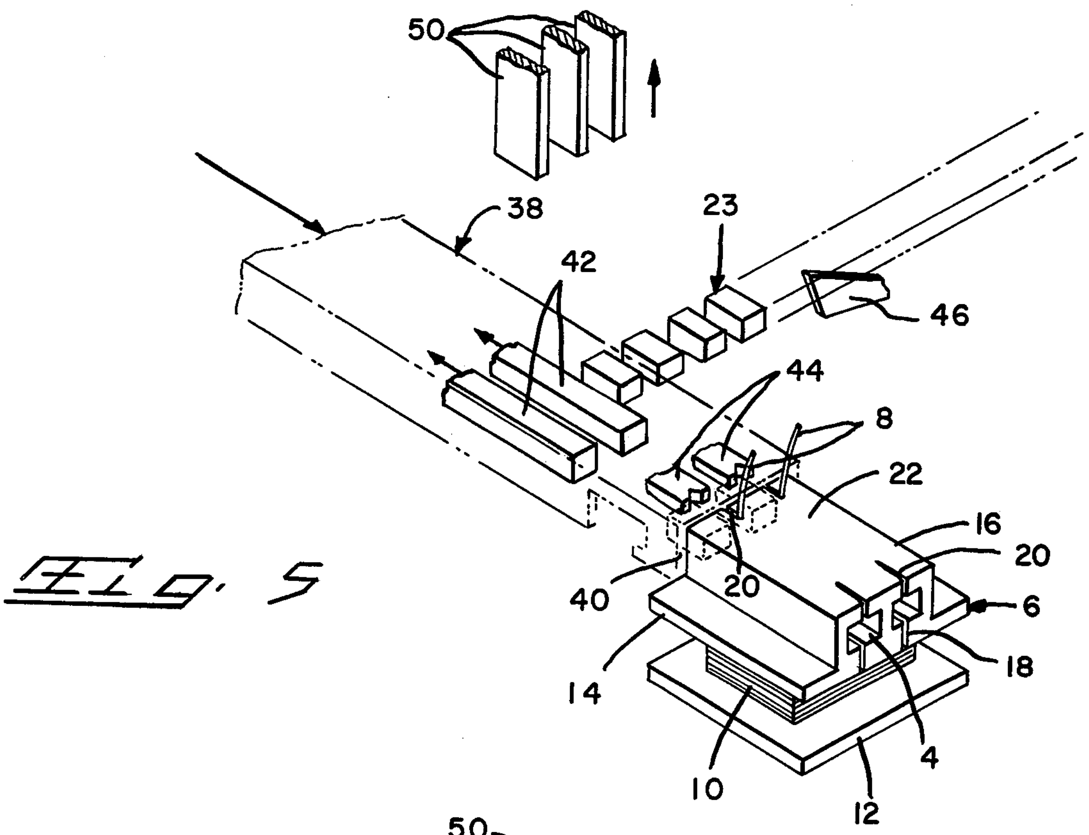
Figure 6:
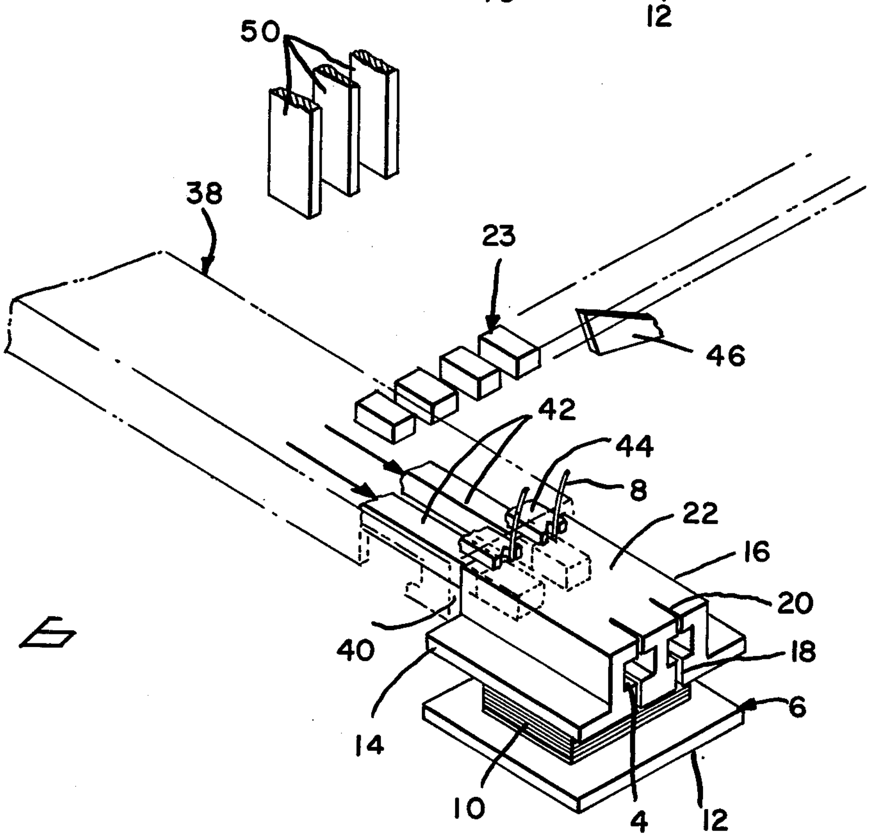
Figure 7:
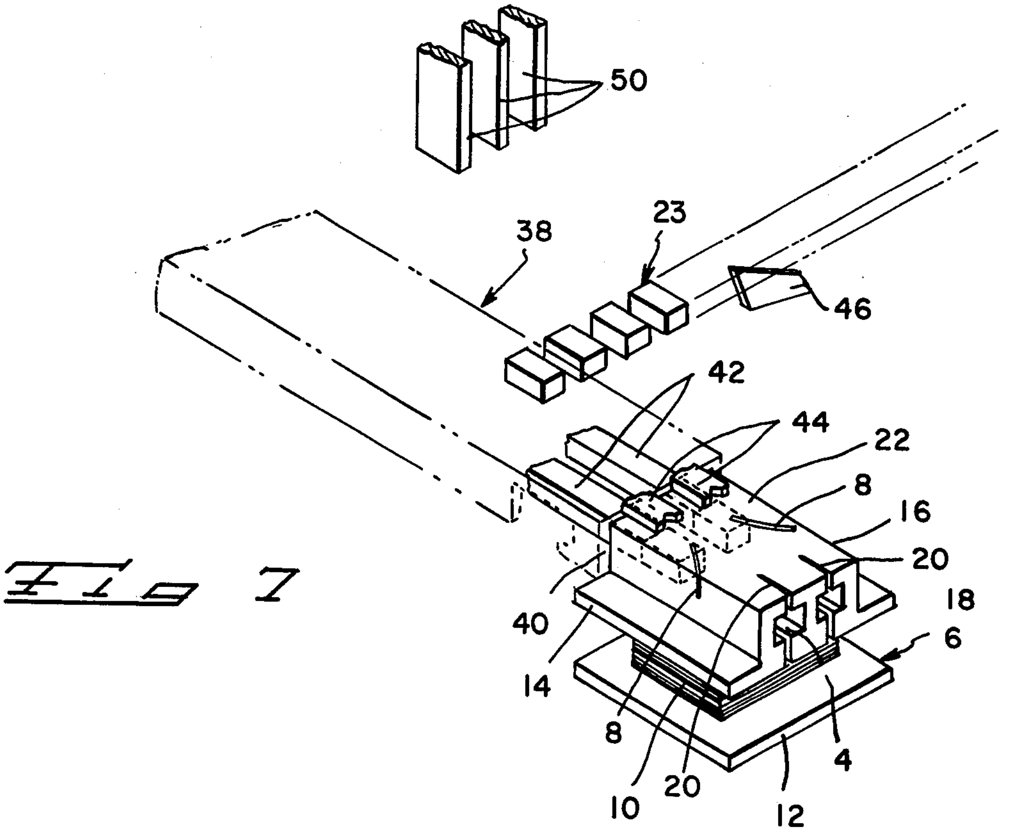

Lever 146 extends rearwardly through a suitable opening 145 in the block 126, see FIG. 10, and is pivoted to this block as shown at 148. The left hand end, or rearward end, 152 of this lever has a cam follower 150 thereon which is received in a cam track 154 provided in the previously identified vertically extending camming plate 84. It will be apparent from the contour of this cam track that during the working stroke of the first slide assembly, the lever 146 will be swung through a slight clockwise arc thereby to lower the terminal strip severing blades 50. The blades will dwell in their lowered position because of the horizontally extending end portion of the cam track and during this dwell of the severing blades, the terminals are advanced to the leading end 40 of the guide tube 38 as shown in FIGS. 3 and 4. The side surfaces of the blades 50 serve as guide surfaces for the terminals during this portion of the cycle so that the terminals will be accurately positioned adjacent to the leading end 40 of the tube 38.

As shown in FIG. 13, the guide tube 38 is generally channel shaped having a top wall 156 and depending sidewalls 158, 160 which extend downwardly towards the base plate 52. The left hand end of the guide tube is normally disposed immediately beyond the base portion of block 126 and is rigidly, but removably, coupled by a coupling latch 162 to a slide block 164 which forms part of the second slide assembly 64. The guide tube assembly 38 is supported in suitable gibs 159 mounted in a recess in block 126, see FIG. 11. The coupling between the guide tube and block 164 includes a pin 166 on which the coupling latch is pivoted and a spring 165 which biases the coupling latch 162 in a clockwise direction as viewed in FIG. 10. This arrangement, and other coupling arrangements described below, permit rapid removal of the guide tube and replacement thereof by a guide tube having different dimensions or contours when it is desired to insert a terminal of a different type from that previously inserted.

The block 164 has a groove or channel 168 (FIG. 12) extending inwardly on its upward surface and a cover plate 170 secured to its upper surface in covering relationship to this channel by suitable fasteners 172. Block 164 is connected to piston rod 60 by an arrangement which permits overtravel of the piston rod. This coupling comprises a rod 174 which extends through the slide 164 and has an enlarged end 176 which is normally located adjacent to or at the leading end 175 of the slide 164. A relatively soft bushing of nylon or similar material 178 is provided at the surface 175 and serves as a stop for the block 164 as will be described below.

Rod 174 extends through a threaded bore 180 in the slide 164 towards the piston rod 60 and through a hollow sleeve 182 which is threaded into the bore. By virtue of this arrangement the left hand end 183 of sleeve 182 functions as an adjustable stop for an adaptor block 186 as described below. A spring 184 surrounds the rod 174 and acts between the inner end of the bore 180 and the rightwardly facing surface of an adaptor block 186 which is secured onto the end of the piston rod 60 of the second piston cylinder. It will thus be apparent that upon rightward movement of the piston rod 60, the slide 164 will be moved rightwardly so long as the slide is not stopped from further rightward movement. This slide 164 is, however, stopped at an intermediate stage of the operating cycle when the leading end of the guide tube 38 comes to rest against the bobbin or other workpiece or fixture 48. During the remaining portion of the working stroke of the second slide assembly 64 the piston rod 60 and the block 186 continue to move rightwardly and the inserters 42 and the wire shearing members 44 are driven rightwardly.

The adjustable stop for block 164 comprises a hollow sleeve 188 which is threaded into a suitable threaded bore in the base portion of the block 126. The left hand end 190 of this sleeve functions as the stop surface and is engaged by the previously identified nylon bushing 178 in block 164. The inside diameter of the threaded sleeve 188 is, of course, sufficient to permit movement of the enlarged head 176 of the rod 174 therethrough during the intermediate and final portions of the working stroke of the second slide assembly.

The inserter extends leftwardly from its normal location (FIG. 10) past the left hand end of the block 126 and is provided with an elongated opening 192 intermediate its ends for reasons discussed below. The left hand portion of the inserter 193 extends into the channel 168 of the slide 164 and is coupled by means of a latch means 194 to a block 195 which is slidably disposed in the channel 168. The coupling arrangement comprises a latch and spring arrangement similar to the coupling between the guide tube and the slide 164 and again permits changing of the tooling in a minimum amount of time. The block 195 is coupled to the previously identified adaptor block 186 by means of a coupling rod 196 which is threaded into block 195 and which extends through a bushing 198 and into a bore 200 in the upper portion of the block 186. The end of the rod 196 has a collar 206 thereon and a spring 208 is interposed between this collar and the plug or bushing 198 so that the rod 196 can be moved rightwardly, as viewed in FIG. 10, relative to the block 186. Leftward movement of the rod 196 from the position shown in FIG. 10 is prevented by an adjustable stop screw 202 which is threaded through the inner wall of the bore 200 so that its end bears against the collar 206, a lock nut 204, being provided on screw 202 to maintain it in a given position of adjustment. Screw 200 thus functions to adjust the rest position of the leading end of the inserter in the insertion zone. It will thus be apparent that upon rightward movement of the block 186, the rod 196 will also be moved rightwardly and the rod 196 is also capable of rightward movement from the position of FIG. 10 independently of the block 186 with accompanying compression of the spring 208.

As explained previously with reference to FIGS. 3 and 4, limited movement of the inserters 42 towards the insertion zone takes place during the working stroke of the first slide 62. This limited stroke of the inserters is effected by means of a drive pin 210 which extends from the block 195 towards the first slide assembly, see FIG. 11. This pin 210 is engaged by a depending arm 214 of a plate 212 which is secured by suitable fasteners to the vertically extending camming plate 84 of the first slide assembly. This limited stroke thus moves the terminals which have been severed from the strip to the leading end 40 of the guide 2, FIG. 4, and after this limited stroke has been completed, the inserter assembly returns to its normal position, FIG. 10, under the influence of the spring 208.

The cut off blades 44 are mounted above the inserter, as viewed in FIG. 10, and beneath the web portion or top wall 156 of the guide tube. The wire cut off assembly is coupled by means of a boss 216 to a wire trim blade slide 218, the boss extending from the slide 218, through the elongated slot 192 in the inserter and into an opening in the wire trimming blade member 44. Trim blade slide 218 is coupled to a guide block 220 at its forward end which is slidably contained in the block 126, the coupling comprising a simple arm and recess on the slide 218 and 220 to permit rapid changeover if required. The left hand end portion of the slide 218 extends over a milled pocket 222 in the base of the channel 168 of slide 164 and an enlarged depending flange is provided on the end of the slide as shown at 224. A spring 226 is contained in the milled pocket 222 and acts between the opposed surfaces of the enlarged portion 224 of the slide and the right hand end of the pocket 222. This arrangement also permits relative movement of the slide 218 with respect to the block 164 but leftward movement of slide 218 beyond the position shown in FIG. 10 is prevented by a depending boss 228 which is disposed against the leading end 175 of slide 164.

It will be recalled from a review of FIGS. 1-7 that the wire severing blades 44 sever the wire prior to movement of the terminals into the cavities in the bobbin and it is important that the timing of this wire severing or trimming operation be precisely controlled. Such control of the timing is achieved by means of a push rod 230 which extends from the adaptor block 186 towards the enlarged end 224 of the slide 218. The leading end of this rod 230 engages the enlarged portion 224 of the slide pushes the slide 218 and the trimming blade means 44 rightwardly with accompanying compression of the spring 226.

The operating cycle of the apparatus is as follows; prior to the initiation of the cycle, the parts will be in the positions of FIGS. 8-11 and FIG. 1, the operator first places the workpiece, the bobbin, in the fixture 48 and closes a suitable electrical switch to cause the apparatus to cycle. In accordance with the preferred mode of operation, the terminals which have been sheared from the strip will be located at the leading end 40 of the guide tube assembly 38 so that upon closing the electrical start switch, piston cylinder 56 is pressurized to drive the second slide assembly 64 rightwardly and then return it to its starting position. During such rightward movement of the second slide assembly, the entire guide tube assembly 38 is first moved against the workpiece and when it arrives at the workpiece, the bushing 178 moves against the end 190 of the threaded sleeve 188. Thereafter, the block 186 continues to move rightwardly and the inserters and wire trimming blades are moved towards and past the bobbin. The wire trimming blades trim the wires prior to complete insertion of the terminals so that the wires are tucked into the cavities. The manner in which the inserter and the trimming blades are driven selectively and in proper timing is explained in detail above. After the second slide assembly returns to its starting position, the operator can remove the workpiece from the fixture but the machine continues its cycle in that the first slide assembly is then driven rightwardly from the positions of FIGS. 8-11 to feed the terminal strip, shear the leading terminals from the strip, and advance the sheared terminals to the leading end of the insertion or guide tube assembly. The cycle is thus split or divided and a portion of each operating cycle is carried out during the time period during which the operator removes the workpiece from the fixture. This cycle sequence is advantageous for the reason that the workpiece can be removed from, and placed on the fixture while the terminal strip feeding, shearing, and advancing steps are being carried out. The effective cycling time, that is, the time required for cycling of the apparatus and placement removal of the workpiece are substantially reduced.

It will be understood that the two inserters and the two trimming blades 44 extend from shank portions of a single tool and that the shank portions of these tools are as shown in FIG. 10. When it is desired to insert a single terminal into a workpiece, tooling having bifurcated ends is simply replaced by tooling having a single tool member, an insertion blade or a trimming blade, thereon. Under some circumstances, it might be feasible to insert three of even more terminals during a single operating cycle.

In the drawing, the apparatus has been set up to trim wires from the upwardly facing surface of the workpiece and the trimming tooling 44 is, therefore, above the insertion tooling 42 as viewed in FIG. 10. Under some circumstances, it may be desired to trim wires against the downwardly facing surface of a workpiece and under such circumstances, the wire trimming tooling can be mounted beneath the insertion tooling. Particularly, the guide block 220 is removed and replaced by the forward portion of the wire trimming tool 44.

The previously identified fixture or work holder 48 is of relatively simple construction since its only function is to locate the bobbin properly in the insertion zone and a bobbin of the type shown in the drawing provides adequate locating edges and surfaces which are positioned against surfaces and edges of the fixture. The fixture can be readily changed and special fixtures can be designed to accommodate a wide variety of workpieces.

It will be appreciated that the pneumatic circuitry can be of conventional and relatively simple design. The circuitry merely requires that the first cylinder 54 be pressurized and exhausted and the second cylinder 56 pressurized and exhausted thereafter. However, it is desirable to provide switches at convenient locations as shown at 232 and 234, FIG. 8 for the control of the solenoid valves which are conventionally used to control circuitry of the type employed for the apparatus.

What is claimed is:

1. Apparatus for inserting a displation type contact terminal into a cavity in a housing when a wire extends across the open end of said cavity so that said wire moves into the wire receiving slot in said terminal during movement of the terminal into the cavity, said apparatus being of the type having strip feeding means for feeding a strip of said terminals along a first path which extends towards the insertion zone of said apparatus, wire trimming means and terminal insertion means reciprocable along a second path extending towards and away from said zone, shearing means for shearing a terminal from said strip in said zone, and fixture means for holding a workpiece in said zone, said apparatus comprising:

first and second slide assemblies which are reciprocable parallel to said second path from retracted positions towards and away from said insertion zone, camming means effective between said first slide assembly and said strip feeding means and between said first slide assembly and said shearing means whereby during reciprocation of said first slide assembly, said strip is fed towards said zone and the leading terminal of said strip is severed from said strip, guide tube means forming part of said second slide assembly, said guide tube means being yieldably coupled to said second slide assembly so that upon arrival of said guide tube means in said insertion zone and against a workpiece on said fixture means said guide tube means comes to rest and said second slide assembly continues to move along said second path, said wire cutter means and said inserter means being movable with said guide tube means, said inserter means and said wire cutter means being yieldably coupled to said second slide assembly independently of said guide tube means whereby during a final portion of said work stroke of said second slide assembly, said inserter means pushes said severed terminal into said workpiece and said wire trimming means trim said wire.

2. Apparatus as set forth in claim 1, said apparatus having engageable means effective between said first slide assembly and said insertion means, said engageable means being effective to advance said insertion means along said second path independently of said guide tube means during a final portion of the stroke of said first slide assembly thereby to advance said severed terminal in said guide tube towards the leading end thereof.

3. Apparatus as set forth in claim 1, said camming means comprising camming plate means on said first slide assembly.

4. Apparatus as set forth in claim 3 having lever means responsive to said camming means for actuating said strip feeding means and said shearing means.

5. Apparatus as set forth in claim 1, said shearing means comprising shearing blade means movable along a third path extending towards said insertion zone.

6. Apparatus as set forth in claim 5, said shearing means being movable through said guide tube means towards said insertion zone.

7. Apparatus as set forth in claim 1, said guide tube means comprising a generally channel-shaped member, said insertion means and said wire trimming means being contained in said guide tube means.

8. Apparatus as set forth in claim 1, said second slide assembly comprising a main slide adaptor block, said guide tube means, said wire trimming means and said terminal insertion means being coupled to said block by separate resilient coupling means.

* * * * *